May 26, 1953 J. C. CARTER 2,639,730
COMBINATION FUELING AND RELIEF VALVE
Filed June 6, 1947 3 Sheets-Sheet 1

INVENTOR.
JAMES COOLIDGE CARTER
BY Kenyon & Kenyon
ATTORNEYS

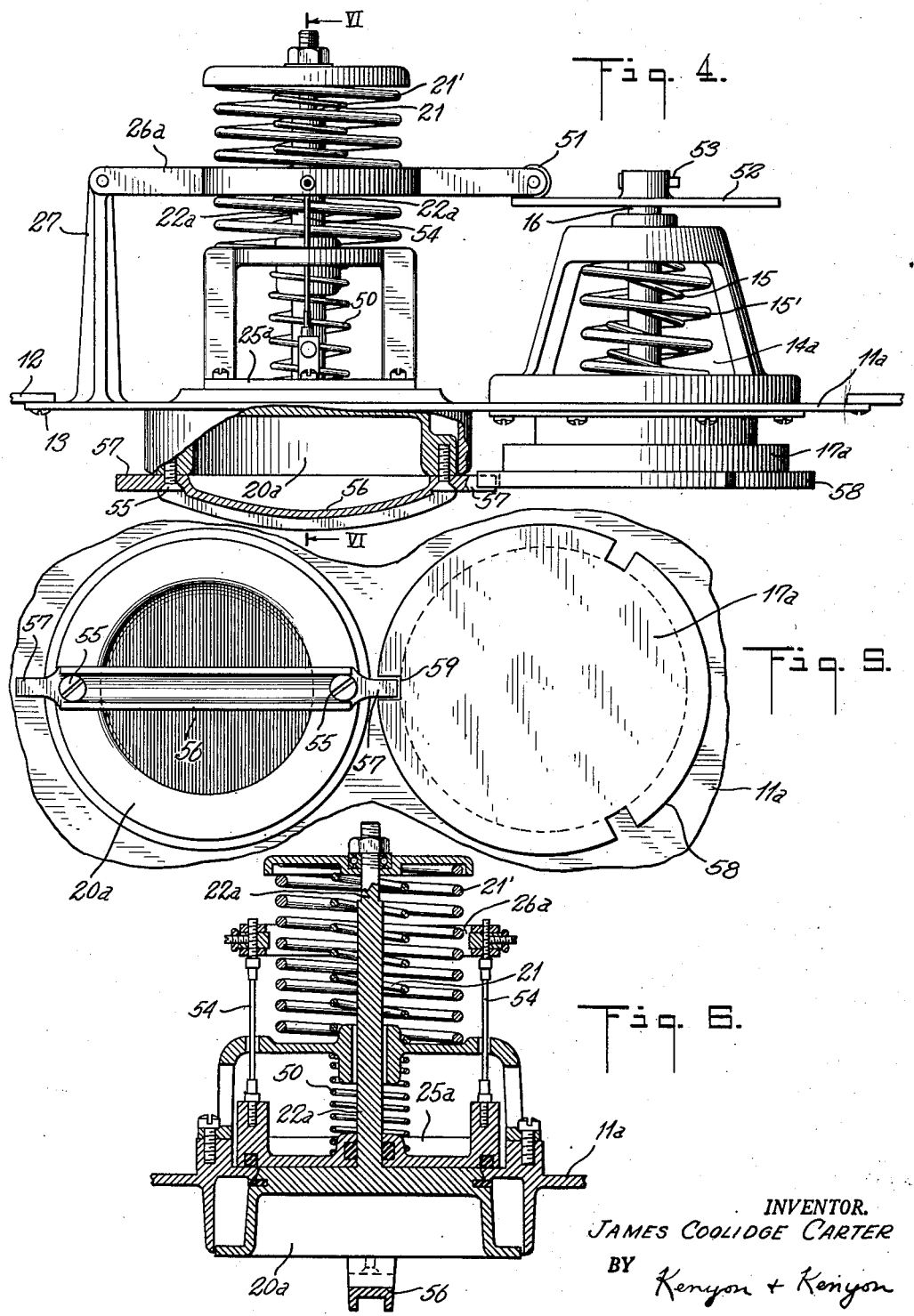

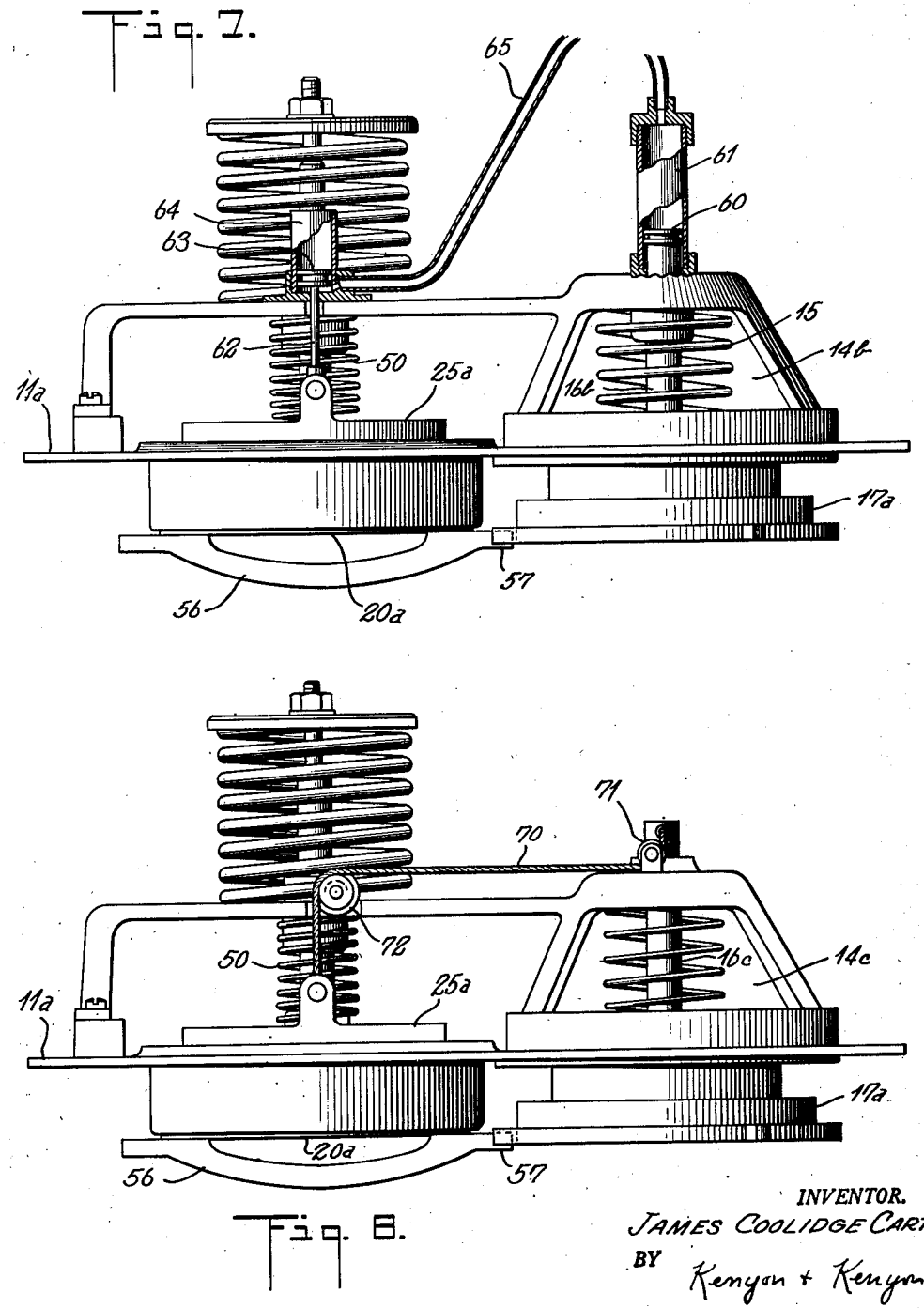

Patented May 26, 1953

2,639,730

UNITED STATES PATENT OFFICE 2,639,730

COMBINATION FUELING AND RELIEF VALVE

James Coolidge Carter, Pasadena, Calif., assignor to The J. C. Carter Company, Pasadena, Calif., a corporation of California Application June 6, 1947, Serial No. 752,976

11 Claims. (Cl. 137—734)

This invention relates to valves and more particularly to fueling and relief valve combinations for use with tank filling devices.

One present major obstacle to under-wing fueling of aircraft is the absence of a completely reliable protection for the aircraft tank against excessive pressures developed when a tank is overfilled. Primary protection is afforded by a pre-set meter on the filling pump. Secondary protection is accomplished through a float-operated switch which shuts off the pump when the tank level exceeds a certain limit. A mechanical relief valve is considered desirable in case both of these fail, but in the past has been found unreliable because it may stick due to lack of use, frozen moisture, or a broken spring. In addition it is impossible to check the conventional type of mechanical relief valve before each fueling without loss of fuel during the checking process unless the fuel tank is completely empty.

Accordingly, the principal object of this invention is to provide a relief valve adapted for use in the underwing fueling of aircraft tanks which will overcome the above difficulties and insure efficient reliable operation.

Another object of this invention is to provide such a relief valve which at the same time is simple yet sturdy and easy and economical to manufacture.

Other and further objects will appear during the course of the following description when taken with the accompanying drawings in which:

Fig. 4 is a partially cut-away side view illustrating a second embodiment of this invention used in an aircraft fuel tank;

Fig. 5 is a partial plan view from below of Fig. 4;

Fig. 6 is a sectional view through plane VI—VI of Fig. 4;

Fig. 7 is a partially cut-away side view illustrating another embodiment of this invention; and Fig. 8 is a side view illustrating still another embodiment of this invention.

Essentially, each embodiment of this invention shown comprises a standard spring-loaded poppet relief valve, with an auxiliary cup valve which rides on the stem of the relief valve, blocking the passage from the tank to the poppet valve when in its downward closed position and allowing free fluid passage to the poppet valve when in its raised or open position. Further, positive sealing of the cup valve in its closed position is insured due to the weight of the fluid pressing down upon its upper surface and holding it firmly against its seat.

Figure 1:
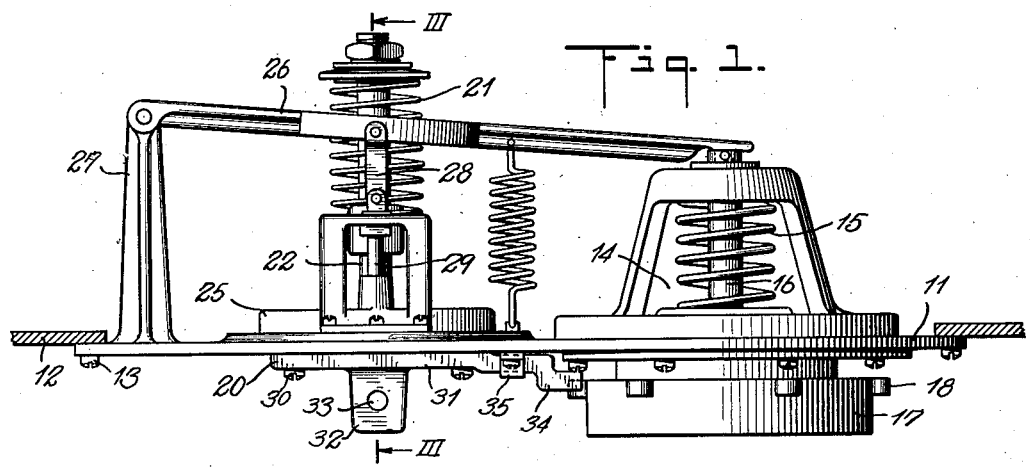
Fig. 1 is a side view illustrating one embodiment of this invention used in an aircraft fuel tank.

In Fig. 1 is shown one embodiment of this invention as used with an aircraft under-wing fueling nozzle valve such as is disclosed in my copending application for Under-Wing Fueling Nozzles and Valves for Aircraft, Ser. No. 705,545, filed October 25, 1946. A plate 11 is provided on which the entire valve assembly is to be mounted, and this is secured to the opening provided in the air craft fuel tank wall 12 by any suitable means such as machine screws 13. Fueling valve 14 is spring loaded as by means of spring 15 and has an inwardly extending stem 16. When not in use, the port or opening to this valve 14 is closed exteriorly of the tank by a dust cap 17 which has projecting lugs 18 around its periphery as shown. Adjacent valve 14 is disposed poppet type relief valve 20, which also is spring loaded as by means of spring 21 and has a stem 22 projecting inwardly though its port or opening. Atop relief valve 20 and surrounding stem 22 is positioned cup valve 25 so as to seal the inner end of the port of valve 20 when in its downward position. Lever or yoke 26 is pivoted at one end to pivot bracket 27, at the other to stem 16, and at an intermediate point through two links 28 and cooperating studs 29 to cup valve 25. To the lower or outer face of valve 20 is secured by any suitable means, such as machine screws 30, an interlocking latch bar 31 which has an ear 32 provided with a suitable aperture 33 through which the hook of a spring scale may be placed. End 34 of bar 31 projects sufficiently as shown so as to be engaged by a lug 18 as dust cap 17 is rotated when removing it prior to filling the tank. On plate 11 is provided a keeper 35 within which latch bar 31 fits when dust cap 17 is in place so as to lock relief valve 20 in its closed position and firmly seal the outer end of its port.

Figure 2:
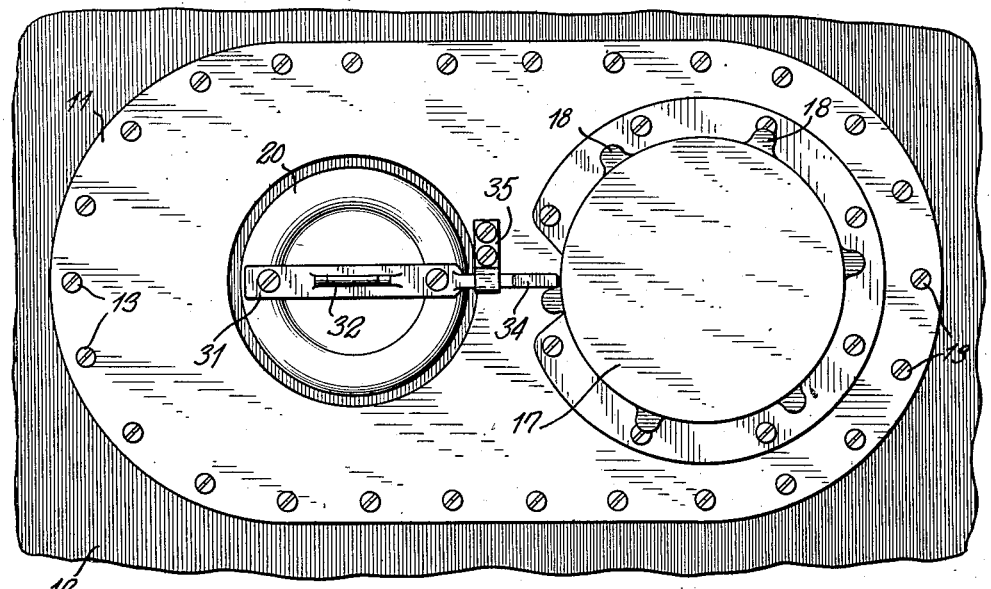
Fig. 2 is a plan view from below of Fig. 1.

In Fig. 2 is shown a plan view from below of Fig. 1 in order to illustrate more clearly the relation between keeper 35, dust cap 17, and interlocking latch bar 31 of relief valve 20.

Figure 3:
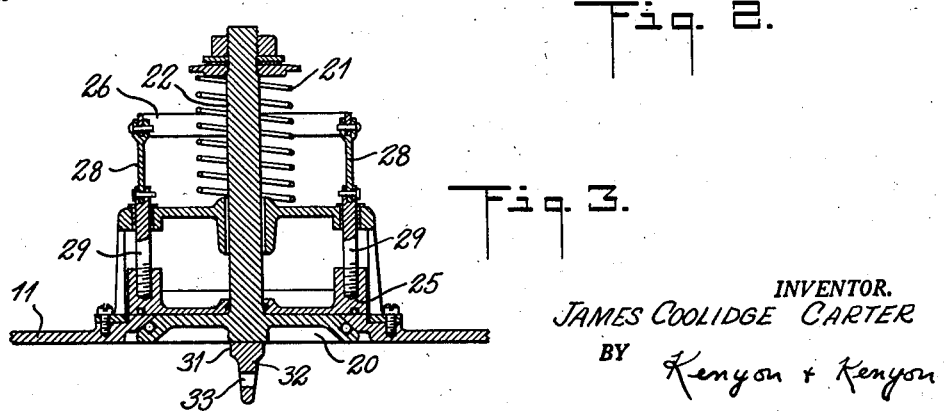
Fig. 3 is a sectional view through plane III—III of Fig. 1.

In Fig. 3 is shown a sectional view through plane III—III of Fig. 1 in order to illustrate the cooperating function of cup valve 25 and relief valve 20. Suitable gaskets and packing as shown are provided for sealing relief valve 20 and cup valve 25 against plate 11 and also for sealing cup valve 25 to stem 22.

This arrangement of ports provides a positive sealing of the tank except at fueling time. The relief valve is then exposed to provide protection against over-filling. As an incident to fueling it is necessary to remove the cap from the tank inlet and with this arrangement of parts the cap cannot be removed without also turning the relief valve on its seat, thus automatically assuring that the relief valve is free on its seat before the fueling begins.

In the operation of refueling the cap 17 is first removed by turning it in a counterclockwise direction as viewed in Fig. 2. When the cap is turned the lug 18 engages the end 34 of latch bar 31, turning the bar 31 and the valve 20 to which the bar is fixed in a clockwise direction as viewed in Fig. 2. This frees the bar from keeper 35 unlocking valve 20. If the valve 20 is free on the seat the dust cap 17 can be removed because the valve 20 will turn but if the valve 20 is stuck on its seat the dust cap 17 cannot be turned to remove it until the valve 20 is freed. This provides an automatic check on valve 20 which must be made before fueling.

The bar 31 also serves as an additional safety feature in that when the bar is engaged in the keeper 35 as shown in Fig. 2 the valve 20 is locked against opening. When the dust cap 17 is in closed position as seen in Fig. 2 one of the lugs 18 holds the bar 31 in the keeper and it will not be dislodged until the dust cap 17 is removed. Thus by turning the valve 20 in a counterclockwise direction as seen in Fig. 2 from the above-described position in which the valve 20 is free to operate as a relief valve to the position shown in Fig. 2 while putting the dust cap 17 in position the valve 20 is locked against accidental opening.

A further check of valve 20 may be made by hooking a scale in hole 33 and pulling down on the valve to see that it is working.

For fueling, the valve 14 is pushed inwardly of the tank by the fueling nozzle above-mentioned. This raises the stem 16 and causes it to lift the right end of the lever or yoke 26 pivoting it about the pivot on bracket 27. Upward movement of the lever or yoke 26 raises the cup valve 25 from its seat through the medium of the links 28 and studs 29 which connect the lever or yoke 26 and the cup valve 25.

When cup valve 25 is raised the valve 20 is exposed and may serve as a relief valve while the valve 25 when seated serves as a positive seal for the tank.

In Fig. 4 is shown another embodiment of this invention as used with an aircraft under-wing fueling nozzle valve similar to that described in connection with Fig. 1. It will be noted that fueling valve 14a differs from fueling valve 14 (Fig. 1) only in that a different mechanical linkage between it and the adjacent cup valve is provided, as will be described in more detail hereinafter, and a second helical spring 15' is provided as a safety measure. Similar parts in Figs. 1 and 4 have been similarly numbered and will not be discussed in detail. Cup valve 25a is essentially the same as cup valve 25 of Fig. 1, the major difference being that it is in this form of the invention spring loaded by means of helical spring 50. Lever or yoke 26a is pivotally mounted at one end to pivot bracket 27 and has a roller 51 rotatably secured to its other end. Atop stem 16 of fueling valve 14a is secured a plate or table 52 as by means of pin 53, and roller 51 rolls upon table 52. Yoke 26a is mechanically connected to cup valve 25a by means of two cables 54. Poppet type relief valve 20a is similar to relief valve 20 of Fig. 1 but it has an additional helical spring 21' provided for reasons of safety. Secured to the lower or outer face of valve 20a by any suitable means, such as machine screws 55, is a handle 56 having a projecting tongue 57 at either end. Fueling valve 14a is provided with a dust cap 17a similar to dust cap 17 of Fig. 1 but differing in that it is provided with a ring-shaped collar 58 in which are provided three grooves or slots 59 spaced equi-distant around its periphery.

In Fig. 5 is shown a partial plan view from below of Fig. 4 in order to illustrate more clearly the relation between handle 56 and its tongues 57, and dust cap 17a and its grooves 59.

In Fig. 6 is shown a sectional view through plane VI—VI of Fig. 4 in order to illustrate the cooperating function of cup valve 25a and relief valve 20a. Suitable gaskets and packing are provided as shown for sealing relief valve 20a and cup valve 25a against plate 11a and also for sealing cup valve 25a to inwardly projecting stem 22a of relief valve 20a.

Prior to removing dust cap 17a, relief valve 20a must be pulled down by means of its handle 56, thus disengaging tongue 57 from slot 59, and thereafter turned and released. Dust cap 17a can then be rotated to remove it so as to expose the opening to fueling valve 14a. At this time the hook of a suitable spring scale can be placed over handle 56 in order to check the spring pressure required to operate valve 20a, all without loss of fluid from the tank since cup valve 25a is in the lowered or closed position. When the fueling nozzle is thereafter attached in place of dust cap 17a and opened, this raises fueling valve 14a, cup valve 25a being raised at the same time due to the mechanical linkage of lever 26a and cables 54, roller 51 rolling as necessary on table 52 during this operation. The full tank pressure is then applied above relief valve 20a. In the event that relief valve 20a operates due to excessive tank pressure, closing of the nozzle closes fueling valve 14a and allows spring 50 to force cup valve 25a down into its closed position, the latter thus preventing further loss of fluid from the tank.

When tank 12 has been filled, the nozzle after being closed is removed and dust cap 17a replaced. Relief valve 20a is then again pulled down by means of its handle 56 and rotated so that a tongue 57 is aligned with a slot 59 in dust cap 17a in the fashion shown in Fig. 5 and then released, locking the dust cap 17a in place.

It is contemplated that in order to decrease wind resistance the fueling valve and relief valve combination disclosed will be mounted in a recess in the under-wing of the aircraft and that a suitable door or cover will be provided for this recess which will be closed during the periods when fueling or de-fueling is not taking place. It is also contemplated that this access door will have a channel mounted on its inner surface in order to prevent closing of this door unless relief valve handle 56 is in its locked position as shown in Fig. 5, thus insuring that when the door is again opened it will be necessary to pull down and rotate relief valve 20a in the manner above-described before the tank can be filled.

It may be pointed out that this second embodiment has an advantage over that shown in Fig. 1 in that there is no reaction due to cup valve 25a which might prevent fueling valve 14a from closing entirely or vice versa. In the embodiment of Fig. 1 care must be taken to insure that fueling valve 14 and cup valve 25 are spaced at the proper distance from lever 26 with respect to one another, since if each were not at the correct distance, either one when completely closed might act as a fulcrum for the lever system shown and prevent the complete closing of the other. It will be obvious that no such close positioning and alignment is necessary with the embodiment disclosed in Fig. 4.

In Fig. 7 is shown a partially cut-away side view of an embodiment similar to that of Fig. 4 but modified to provide a hydraulic linkage between the fueling valve and cup valve instead of the mechanical linkage of Fig. 4. Again similar parts of this figure and the other figures of this specification are similarly numbered and will not be explained in detail. As shown, inwardly extending stem 16b of fueling valve 14b has a piston 60 formed at its upper end. Surrounding piston 60 is a suitable chamber 61. Cup valve 25a is provided with two connecting rods 62 (only one shown), each rod 62 ending in a piston 63 surrounded by a suitable chamber 64. A pipe 65 connects chamber 61 with chambers 64. Suitable vents (not shown) are also provided so that when fueling valve 14b is opened in the manner above-described, the fluid of the hydraulic system is forced from chamber 61 via pipe 65 to chambers 64, forcing pistons 63 up and consequently raising cup valve 25a. When fueling valve 14b is closed due to the removal of the nozzle as above-described and the action of spring 15, the fluid of the hydraulic system is sucked back into chamber 61 in part and forced back in part due to the action of spring 50 in closing cup valve 25a. The operation and cooperation of dust cap 17a, relief valve 20a, and handle 56 are as above-described in connection with Fig. 4.

In Fig. 8 is shown still another method of linking the fueling valve and cup valve. This embodiment differs from that shown in Fig. 7 only in that instead of the hydraulic system shown in Fig. 7, two cables 70 (only one shown) are provided, each one passing from stem 16c of fueling valve 14c and around pulleys 71 and 72 to cup valve 25a as shown in order to raise cup valve 25a whenever fueling valve 14c is opened. When fueling valve 14c is closed, cup valve 25a is forced closed due to the action of spring 50 as above-described.

Numerous additional applications of the principles above-disclosed in the embodiments shown will occur to those skilled in the art and no attempt has been made to exhaust such possibilities. The scope of this invention is defined in the following claims.

What is claimed is:

1. In apparatus of the class described the combination of supporting means having a pair of ports giving access to a tank, a spring-loaded fueling nozzle valve controlling one of said ports and adapted to be moved inwardly to gain access to said tank for filling, a relief valve controlling the other port and including a stem extending inwardly through its port and located adjacent said fueling nozzle valve, a third valve surrounding the stem of said relief valve and movable independently of said relief valve, and adapted to seal the inner end of the relief valve port, and an operating connection connected to said fueling valve and third valve to move said fueling valve and third valve simultaneously from closed position to open position whereby simultaneous opening and closing of said valves is effected.

2. Apparatus according to claim 1 including a cap closing the outer end of the fueling valve port and rotatable for removal from said outer end, a projection on said relief valve engageable with said cap to prevent removal of said cap when said relief valve is in closed position and said cap is engaged on the fueling valve, and disengageable by movement of said relief valve to permit removal of said cap.

3. Apparatus according to claim 1 including a cap closing the outer end of the fueling valve port and rotatable for removal from said outer end, a recess in said cap, and a projection on said relief valve adapted to engage said recess, whereby said projection must be disengaged from said recess by moving said relief valve away from its seat to check for freeness, before said cap can be rotated for removal from said outer end.

4. Apparatus according to claim 1 including a cap closing the outer end of the fueling valve port and rotatable for removal from said outer end, a projection on said relief valve for rotating it in its seat to assure its freeness, and a face on said cap adapted to engage said projection as the cap is rotated for removal from said outer end.

5. Apparatus according to claim 4 including a keeper constructed and arranged to engage said projection to lock said relief valve against operation when said projection is positioned to be engaged by said face on rotation of the cap from position closing said outer end to position for removal from said outer end.

6. In apparatus of the class described the combination of a support having a pair of ports giving access to a tank, a spring-loaded fueling nozzle valve controlling one of said ports and adapted to be moved inwardly to gain access to said tank for filling, a relief valve controlling the outer end of the other port including a stem extending inwardly through its port and located adjacent said fueling nozzle valve, a third valve surrounding the stem of said relief valve and movable independently of said relief valve and adapted to seal the inner end of the relief valve port, and a lever pivotally connected to said third valve and said fueling nozzle valve and fulcrumed at a point spaced from its connection to said valves so that when the fueling nozzle valve is in closed position said third valve is also in a closed position and seals the inner end of the port whose outer end is closed by said relief valve and inward movement of said fueling nozzle valve opens said third valve by swinging said lever.

7. In apparatus of the class described the combination of a support having a pair of ports, a fueling nozzle valve sealing one port, a relief valve sealing the other port, a third valve sealing said other port, a valve operator for opening said third valve connected thereto and operatively connected to and actuated by the opening of said fueling nozzle valve to open said third valve, disengageable means for closing the outer end of the fueling nozzle valve port, means extending between said disengageable means and said relief valve cooperating with said disengageable means for rotating said relief valve as said disengageable means is disengaged, and locking means so constructed and arranged as to engage said cooperating means to lock said relief valve against operation when said disengageable means is engaged, whereby said relief valve is checked for freeness during the disengagement of said disengageable means, and the opening of said fueling nozzle valve will open said third valve.

8. In apparatus of the class described the combination of a support having a pair of ports, a fueling nozzle valve sealing one port, a relief valve sealing the other port, a third valve sealing said other port, a valve operator for opening said third valve operatively connected to and actuated by the opening of said fueling nozzle valve to open said third valve, a cap closing the outer end of the fueling nozzle valve port, a projection on said relief valve engageable with said cap to prevent removal of said cap when said relief valve is in closed position and said cap is engaged on the fueling nozzle valve, and disengageable by movement of said relief valve to permit removal of said cap.

9. In apparatus of the class described the combination of a support having a pair of ports giving access to a tank, a spring-loaded fueling nozzle valve controlling one port and adapted to be moved inwardly to gain access to said tank for filling, a relief valve controlling the other port and including a stem extending inwardly through its port and located adjacent said fueling nozzle valve, a third spring-loaded valve surrounding the stem of said relief valve and adapted to seal the inner end of the relief valve port, a lever in engagement with and adapted to be swung by said fueling nozzle valve by its opening movement, and a connection between said lever and said third valve to lift said third valve from its seat when said fueling nozzle valve swings the lever on opening.

10. In apparatus of the class described the combination of a support having a pair of ports giving access to a tank, a spring-loaded fueling nozzle valve controlling one port and adapted to be moved inwardly to gain access to said tank for filling, a relief valve controlling the other port and including a stem extending inwardly through its port, a third spring-loaded valve surrounding the stem of said relief valve and adapted to seal the inner end of the relief valve port, and a valve operator comprising a cylinder and a piston operatively connected to said fueling nozzle valve, a cylinder and a piston operatively connected to said third valve, and a hydraulic connection between said cylinders, whereby the opening of the fueling nozzle valve will actuate its piston and cylinder to actuate the other piston and cylinder to open said third valve.

11. In apparatus of the class described the combination of a support having a pair of ports giving access to a tank, a spring-loaded fueling nozzle valve controlling one of said ports and adapted to be moved inwardly to gain access to said tank for filling, a relief valve controlling the other port and including a stem extending inwardly through its port and located adjacent said fueling nozzle valve, a third spring-loaded valve surrounding the stem of said relief valve and adapted to seal the inner end of the relief valve port, and a valve operator for opening said third valve connected to and operable by the opening movement of said fueling nozzle valve and comprising a flexible cable connecting said fueling nozzle valve and said third valve to raise said third valve when said fueling nozzle valve is raised.

JAMES COOLIDGE CARTER.

References Cited in the file of this patent

UNITED STATES PATENTS

| Number | Name | Date |
|---|---|---|
| 1,166,033 | Yoder | Dec. 28, 1915 |
| 1,548,098 | Raymond | Aug. 4, 1925 |
| 1,776,877 | Yonkese | Sept. 30, 1930 |
| 1,793,777 | Condon | Feb. 24, 1931 |
| 2,225,838 | Miller | Dec. 24, 1940 |
| 2,319,907 | Stirling | May 25, 1943 |
| 2,362,297 | Newell | Nov. 7, 1944 |
| 2,362,559 | Jauch | Nov. 14, 1944 |